Feb. 27, 1951

J. E. PROGNEAUX 2,543,377

SOIL PULVERIZER

Filed Jan. 28, 1947

INVENTOR
JEAN E. PROGNEAUX
BY
Jones & Roe
ATTORNEYS

Feb. 27, 1951 J. E. PROGNEAUX 2,543,377
SOIL PULVERIZER
Filed Jan. 28, 1947 3 Sheets—Sheet 2

INVENTOR
JEAN E. PROGNEAUX
BY
Jones & Roe
ATTORNEYS

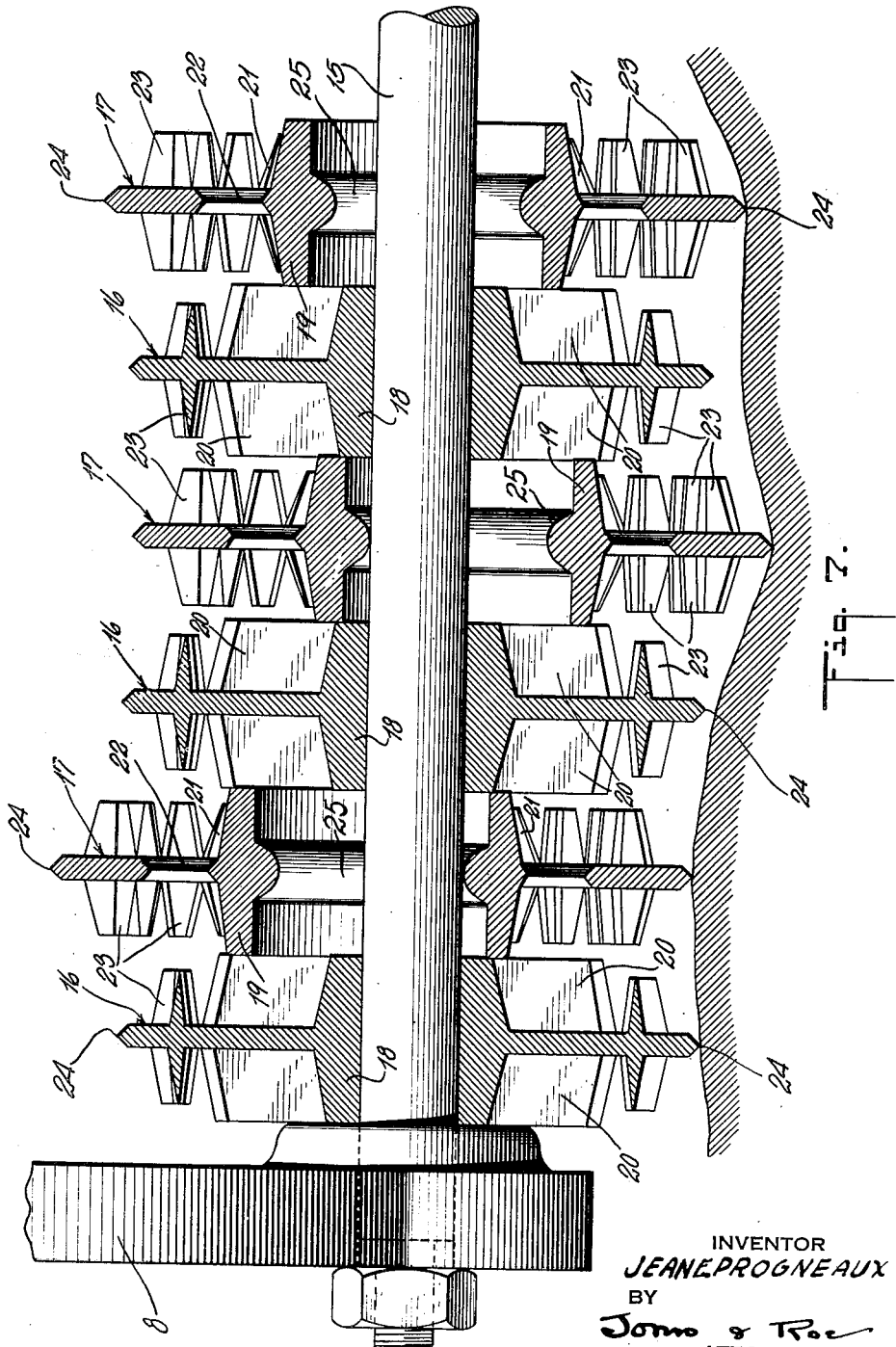

Patented Feb. 27, 1951

2,543,377

UNITED STATES PATENT OFFICE 2,543,377

SOIL PULVERIZER

Jean Ernest Progneaux, Bronxville, N. Y.

Application January 28, 1947, Serial No. 724,835

3 Claims. (Cl. 55—24)

This invention relates to a machine for thoroughly pulverizing and loosening soil to render it in excellent condition for sowing of seeds, as beets, carrots and the like.

Further, the invention involves small and large alternately arranged revolving discs, and in this particular respect, the hubs of one set of discs, preferably the large, are provided with oversized hubs, internally of which medial ribs are formed to prevent clogging of the bearings.

In the drawings:

Fig. 7 is a longitudinal sectional elevation of a portion of the complete assembly, taken along lines 7—7 of Fig. 2.

Figure 1:
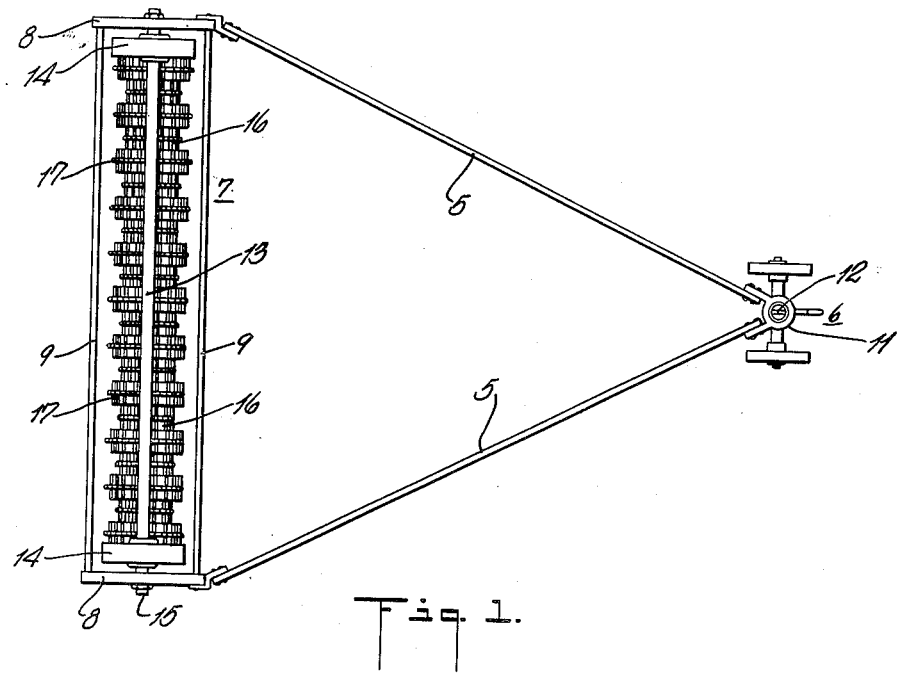
Fig. 1 is a top plan view of the complete machine.

More specifically, the reference character 5 represents a chassis in the form of a yoke, the forward end of which is connected to the two-wheeled support 6, while the rear ends thereof are attached to opposite terminals of the frame 7, comprising circular heads 8, joined by tie-rods 9. Support 6 has an upright stub shaft 10 removably sustained in the bushing 11 by king pin 12.

Mounted at the top of the frame is an axle 13, which in turn carries two wheels 14, normally inactive, but intended to be reversed so that they will contact the ground to permit transporting the implement from one point to another, as will presently be explained.

Diametrically opposite axle 13 and paralleling the same at the base of the frame is another axle 15, and disposed alternately thereon are small and large discs 16—17. The small discs are provided with hubs 18 which closely engage axle 15, although they are not fixed thereto, and the large discs are equipped with oversized hubs 19 which allow their discs to move vertically with respect to the axle. Otherwise, structurally the two sets of discs are identical, with the exception that the radial fins 20 of the small discs are longer than the corresponding fins 21 of the large discs— due manifestly to the difference in the diameters of the respective hubs. Both discs have arcuate openings 22 parallel to their hubs; a circular series of lateral projections 23; and peripherial serrated teeth 24.

Reverting to the oversized hub of the large disc, it will be seen that extending medially from the inside of the hub is a narrow annular rib 25. This rib serves not only to reduce friction with regard to the axle, but of more importance, it aids materially in avoiding clogging.

Figure 2:
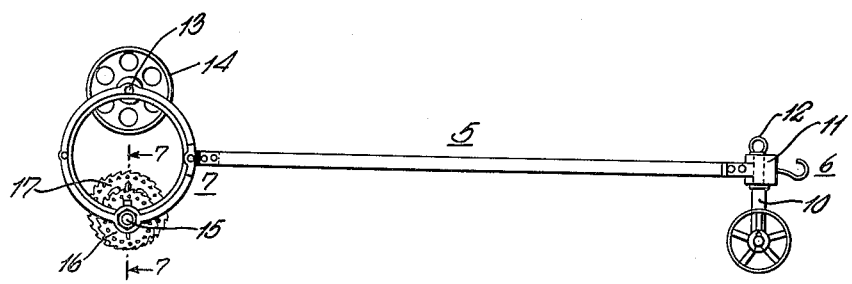
Fig. 2 is a side elevation thereof.
Figure 3:
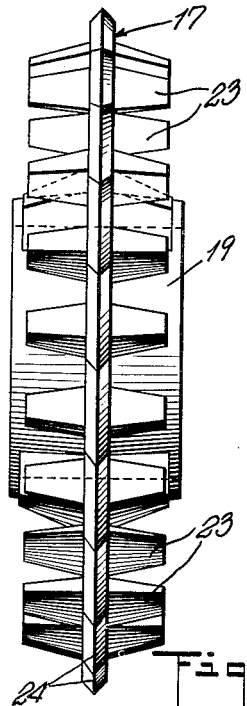
Fig. 3 is an end elevation of one of the large discs.
Figure 4:
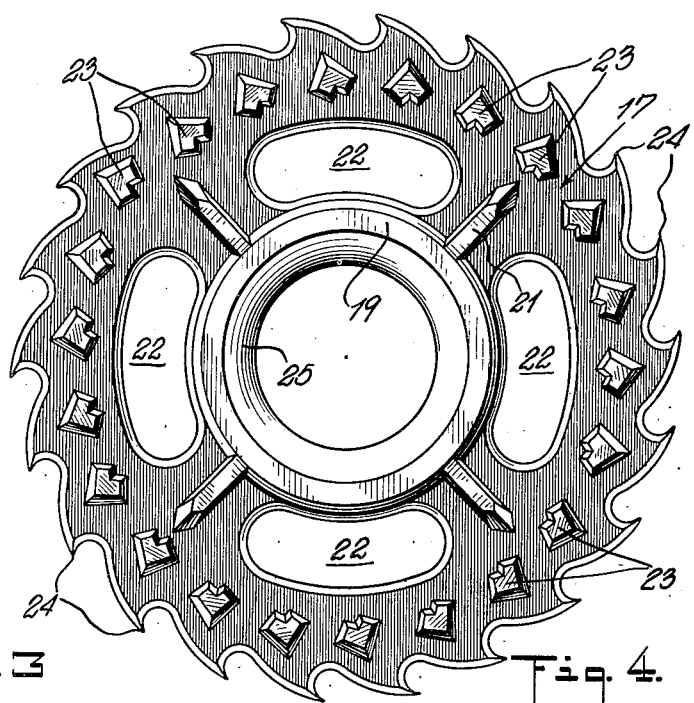
Fig. 4 is a side elevation of the same.
Figure 5:
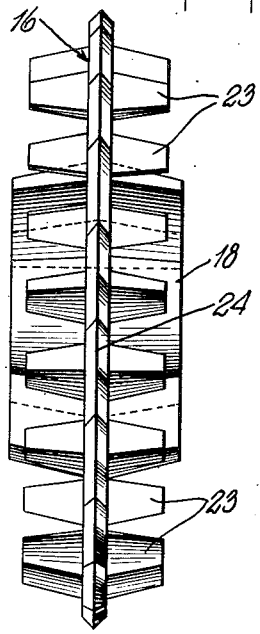
Fig. 5 is an end elevation of one of the small discs.
Figure 6:
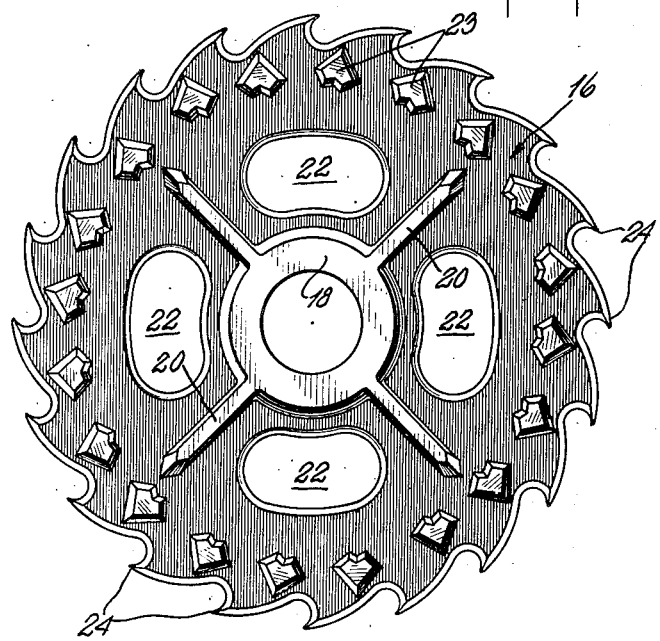
Fig. 6 is a side elevation thereof.

The implement, as illustrated in Fig. 2 is drawn over the terrain by any suitable means. All the discs, both small and large, contact the ground and as the pulverizer moves forward the differential speed of the discs, combined with the action of the radial fins, lateral projections and serrated teeth, thoroughly scarifies and mulches the soil even if moist and tacky. Clogging of the large discs is reduced to a minimum, and the vertical play thereof is maintained by reason of the knife-like action of the annular ribs 25 toward axle 15. Also, there ensues a disintegration of any relatively large lumps and the dispersion of the finer particles of soil to either side of the ribs through the openings 22.

The construction and arrangement hereinbefore described eliminates employment of expensive bronze ring bearings. Moreover, when excessive wear results in undue play, it is simply necessary to add or substitute a new disc.

I claim:

1. A soil pulverizer, comprising in combination a frame, an axle carried by the frame, small and large discs disposed alternately on the axle, the small discs having hubs freely movable with respect to the axle, while the large discs are equipped with over-sized hubs which permit their discs to move vertically with respect to the axle, the hub of each large disc, internally, being provided with an annular rib which is engageable and disengageable with the axle, and all of the hubs of the small and large discs being operable directly on the axle.

2. A soil pulverizer, comprising in combination a chassis, an axle, two sets of discs of differential diameters carried by the axle, the set of discs of smaller diameter having hubs freely movable with respect to the axle while the set of discs of larger diameter are equipped with over-sized hubs which permit the larger discs to move vertically with respect to the axle; the hub of each larger disc, internally, being provided with an annular rib which is engageable and disengageable with the axle.

3. A soil pulverizer, comprising in combination a chassis, an axle disposed transversely thereof, two sets of discs of differential diameters mounted on the axle, the larger set of discs equipped with over-sized hubs which permit the discs to move vertically with respect to the axle, each hub of the larger set, internally, being provided with an annular rib and all of the discs having openings adjacent the hubs, both sets of discs equipped with laterally projecting fins, on opposite sides thereof and interposed between the openings, and the fins of the smaller set converging towards the over-size hubs of the larger discs.

JEAN ERNEST PROGNEAUX.

REFERENCES CITED

The following references are of record in the file of this patent:

UNITED STATES PATENTS

| Number | Name | Date |
|---|---|---|
| 830,126 | Wilder | Sept. 4, 1906 |
| 1,386,167 | Dunham | Aug. 2, 1921 |
| 2,193,009 | Riggs | Mar. 12, 1940 |

FOREIGN PATENTS

| Number | Country | Date |
|---|---|---|
| 107,851 | France | May 29, 1875 |
| 539,149 | Great Britain | Aug. 29, 1941 |